UNITED STATES PATENT OFFICE.

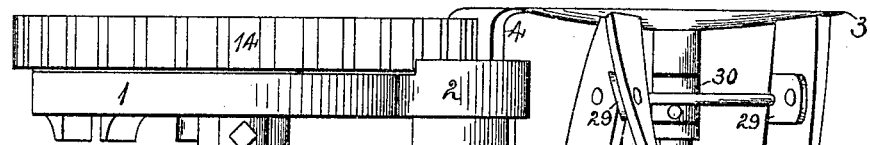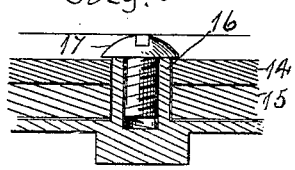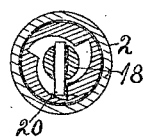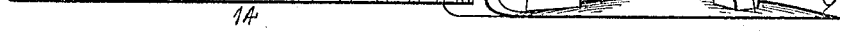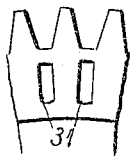

HARRY H. BENSON, OF ROCKFORD, ILLINOIS, ASSIGNOR TO BENSON LAWN MOWER CO., OF ROCKFORD, ILLINOIS, A CORPORATION OF ILLINOIS.

LAWN-MOWER.

943,857.    Specification of Letters Patent.    Patented Dec. 21, 1909.

Application filed March 7, 1908. Serial No. 419,704.

*To all whom it may concern:*

Be it known that I, HARRY H. BENSON, a citizen of the United States, residing at Rockford, in the county of Winnebago and State of Illinois, have invented certain new and useful Improvements in Lawn-Mowers, of which the following is a specification.

The object of this invention is to construct a lawn mower with a center drive which permits the knives to cut the full width of the machine.

The further object of this invention is to form the knives in sections and overlapping at the center of the machine so that all the grass will be cut.

The further object of this invention is to locate the driving spur gears adjacent to the inner face of the drive wheels, and the driven pinions located beyond the periphery of the driving wheels, in order that increased speed may be given to the driven pinions without the employment of intermediate gears.

In the accompanying drawings, Figure 1 is a plan view of a lawn mower containing my improvements. Fig. 2 is a vertical transverse section on dotted line *a a* Fig. 1. Fig. 3 is a section on dotted line *b b* Fig. 2. Fig. 4 is a transverse section on dotted line *c c* Fig. 1. Fig. 5 is a transverse section of a portion of the sectional pinion showing the opening 31 for permitting the discharge of any grass that might get between the teeth. Fig. 6 is a face representation of a portion of the sectional pinion having the discharge openings 31.

The end frames are of like construction, each comprising the recessed end 1 from the periphery of which extends the smaller recess 2 terminating in a bearing 5. From the forward portion of the recessed end extends a dished bearing 3, connected to the recessed end by the offset portion 4. This offset portion 4 has a curved extension 6 which is concentric with the recessed end 1. These recessed ends 1 are held separated by the rod 7, and the handle 8.

To the curved extensions 6 of the ends is secured a support 9 by the screws 10, and a roller 11 is journaled in the support. A cutting edge 12 is connected to the support 9 by the screws 13. This support assists in holding the recessed ends 1 suitably separated.

The supporting wheels are the same, and each wheel 14 has a spur toothed gear 15 secured to its inner face so as to rotate with the wheel. The spur gear is located in the recessed end 1 of the frames. This combined wheel and spur gear are located on a stud 16 extending from the recessed end, and held from displacement by the screw 17.

The bearings 5 support a shaft 18 and on each of its ends is located a spur toothed pinion 19. These pinions have a driving connection with the shaft through the ratchets 20, and drive in one direction only. These pinions are located in the recesses 2 and mesh with the spur gears 15.

To the shaft 18 centrally of its length is secured a sectional spur gear comprising in this instance, five sections 21 forming one side of the gear and five sections 22 forming the other side of the gear. These ten sections as seen in elevation at Fig. 2, form a complete spur gear.

A shaft 23 is loosely mounted in the dished bearings 3. To this shaft 23 centrally of its length is secured a sectional spur pinion comprising in this instance three sections 24 forming one side of the pinion, and three sections 25 forming the other side of the pinion. These six sections as seen in elevation at Fig. 2, form a complete spur pinion.

The sections 21 of the spur gear mesh with the sections 24 of the spur pinion, and the sections 22 of the spur gear mesh with the sections 25 of the spur pinion, so that the rotation of the spur gear will impart a rotary movement to the spur pinion, the sections of one side alternating with the sections of the other side.

To the shaft 23 is secured a knife in two sections 26 and 27. A section located each side of the spur pinion. The ends of the knives adjacent to the spur pinion are located between the sections of the spur pinion in order that their meeting edges may overlap as clearly shown at Fig. 1. These knives have their inner ends supported by brackets 28 connected to the spur pinion, and their outer ends are supported by brackets 29 connected to hubs 30 which are pinned to the shaft 23.

As the spur pinion is rotated, the knives will be rotated and pass the cutting edge 12. As the cutting edges of the knives extend considerably beyond the spur pinion secured to the shaft 23, their inner ends will pass within the spur gear secured to the shaft 18 between two sections of the gear on the same side. The other ends of the knives conform to the dished bearings 3 in order that grass may be cut the full width of the driving wheels, and the ends being dished will cause the grass to be drawn inward in order that the knives may reach it.

At Figs. 5 and 6 is shown a section of the spur gear secured to the shaft 18 in which a discharge opening 31 is formed between the teeth of the gear, so that any grass or dirt will pass through the opening and prevent clogging of the teeth of the gear. The spur gear shown in Fig. 2 of the drawings is not of a size to show the openings 31 in connection with the teeth thereof.

By forming the spur gear and spur pinion in sections as shown, a larger spur gear and smaller spur pinion can be employed to give the necessary speed to the knives without the employment of intermediate gearing. The inner ends of the knives as they pass within the periphery of the sectional spur gear will throw the cut grass rearward free of the teeth of the gear.

By the concentric connection between the support for the roller 11 and knife 12, and the wheel frame, the position of the roller 11 with respect to the knife is never changed, the cutters 27 can be lowered to properly contact with the knife without changing the position of the knife with relation to the ground.

I claim as my invention.

1. A lawn mower comprising a frame having dished ends, a shaft supported by the ends, cutting knives supported by the shaft having their ends conforming approximately with the inner faces of the ends, and means for rotating the knives.

2. A lawn mower comprising a frame having dished circular ends, a shaft supported by the ends, cutting knives supported by the shaft having their ends conforming approximately with the inner faces of the ends, and means for rotating the knives.

3. In a lawn mower, the combination of a frame, traction wheels supporting the frame, a shaft having a gear connection with each wheel, a spur gear secured to the shaft, a rotatable cutter, a spur gear supported by the cutter, and meshing with the spur gear on the shaft, the spur gear supported by the shaft having discharge passage ways between the teeth and extending through the side of the gear.

4. A lawn mower comprising a main frame having forwardly extending surfaces concentric with the driving wheels, driving wheels supporting the main frame, a rotatable cutter supported by the main frame, a roller located between the cutter and driving wheels, a frame in which the roller is journaled and having a curved surface adjustably connected to the curved surface of the main frame, and a knife carried by the roller supporting frame.

5. A lawn mower comprising cutting knives in two sections, the inner ends of the knives of the two sections overlapping, a spur pinion comprising a central web with offset sections adapted to rotate the knives, and a spur gear comprising a central web with offset sections meshing with the sections of the spur pinion.

In testimony whereof I have hereunto set my hand in presence of two subscribing witnesses.

HARRY H. BENSON.

Witnesses:
 A. O. BEHEL,
 E. D. E. N. BEHEL.